United States Patent
Braun et al.

(10) Patent No.: US 11,870,848 B2
(45) Date of Patent: Jan. 9, 2024

(54) METHOD FOR CONTROLLING AN OPC UA SERVER, OPC UA SERVER, CONTROL CIRCUIT, COMPUTER PROGRAM, AND COMPUTER-READABLE MEDIUM

(71) Applicant: ABB Schweiz AG, Baden (CH)

(72) Inventors: Roland Braun, Niederkassel/Luelsdorf (DE); Philipp Bauer, Weinheim (DE); Francisco Mendoza, Schriesheim (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/706,772

(22) Filed: Mar. 29, 2022

(65) Prior Publication Data

US 2022/0321652 A1 Oct. 6, 2022

(30) Foreign Application Priority Data

Mar. 30, 2021 (EP) .................................... 21165993

(51) Int. Cl.
*H04L 67/1097* (2022.01)
*H04L 67/568* (2022.01)

(52) U.S. Cl.
CPC ........ *H04L 67/1097* (2013.01); *H04L 67/568* (2022.05)

(58) Field of Classification Search
CPC ...... H04L 67/10–67/133; H04L 67/50–67/568
See application file for complete search history.

(56) References Cited

U.S. PATENT DOCUMENTS

| | | | |
|---|---|---|---|
| 6,963,953 B2 | 11/2005 | Nakajima | |
| 11,023,488 B1* | 6/2021 | Bono | G06F 16/1824 |
| 11,093,468 B1* | 8/2021 | Bent | G06F 16/27 |
| 11,604,706 B2* | 3/2023 | Nara | G06F 11/1469 |
| 2003/0221064 A1* | 11/2003 | Honda | G06F 3/0689 |
| | | | 711/112 |
| 2004/0250019 A1* | 12/2004 | Fujie | G06F 11/1076 |
| | | | 714/E11.034 |
| 2010/0205340 A1* | 8/2010 | Wei | H04L 12/413 |
| | | | 710/110 |
| 2014/0281008 A1* | 9/2014 | Muthiah | H04L 67/01 |
| | | | 709/231 |
| 2021/0081129 A1* | 3/2021 | Tian | G06F 3/067 |
| 2021/0373761 A1* | 12/2021 | Karr | G06F 3/0614 |

FOREIGN PATENT DOCUMENTS

CN 108199897 A 6/2018

* cited by examiner

*Primary Examiner* — Clayton R Williams
(74) *Attorney, Agent, or Firm* — Leydig, Voit & Mayer, Ltd.

(57) ABSTRACT

A server, control circuit, or method for controlling an OPC UA Server includes receiving a request for data from an OPC UA Client, determining whether the request and/or the data requires a slow data access or a fast data access by a hardware implemented control circuit of the OPC UA Server; obtaining first data from a memory unit of the OPC UA Server when the request and/or the data requires the slow data access; obtaining second data from an second address space of the control circuit when the request and/or the data requires the fast data access; and sending the obtained first or second data to the OPC UA Client.

18 Claims, 3 Drawing Sheets

METHOD FOR CONTROLLING AN OPC UA SERVER, OPC UA SERVER, CONTROL CIRCUIT, COMPUTER PROGRAM, AND COMPUTER-READABLE MEDIUM

CROSS-REFERENCE TO RELATED APPLICATIONS

This patent application claims priority to European Patent Application No. 21165993.3, filed on Mar. 30, 2021, which is incorporated herein by reference in its entirety.

FIELD OF THE DISCLOSURE

The present disclosure relates generally to the field of communications protocols for industrial automation and, more specifically, to an open platform communications (OPC) having unified architecture (UA) Server, a method for controlling a OPC UA Server, the OPC UA Server, a control circuit for the OPC UA Server, a computer program for performing the method, and a computer-readable medium in which the computer program is stored.

BACKGROUND OF THE INVENTION

Conventional embedded OPC UA Server applications run purely on software, e.g. firmware. These embedded applications can handle several thousand nodes, i.e. addresses, in their address space, with every node being representative for associated data. However, such pure embedded software-based solutions may be too slow and therefore may not meet all real-time operation related requirements. Solutions previously have proposed to develop a hardware accelerated, built into silicon OPC UA Server. Such hardware based OPC UA Servers can handle up to a few hundred nodes very quickly but may be too small for all the data needed, e.g. for instrumentation devices.

BRIEF SUMMARY OF THE INVENTION

In one aspect, the present disclosure describes a system and method for controlling an OPC UA Server, the OPC UA Server, a control circuit for the OPC UA Server, a computer program for performing the method, and a computer-readable medium in which the computer program is stored, which enable to provide an access to non-time-critical data and/or a large amount of data, and to provide a fast data access.

This object is achieved by the subject-matter of the independent claims. Further exemplary embodiments are evident from the dependent claims and the following description.

BRIEF DESCRIPTION OF THE SEVERAL VIEWS OF THE DRAWING(S)

The subject matter of the disclosure is explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF THE INVENTION

Figure 1:
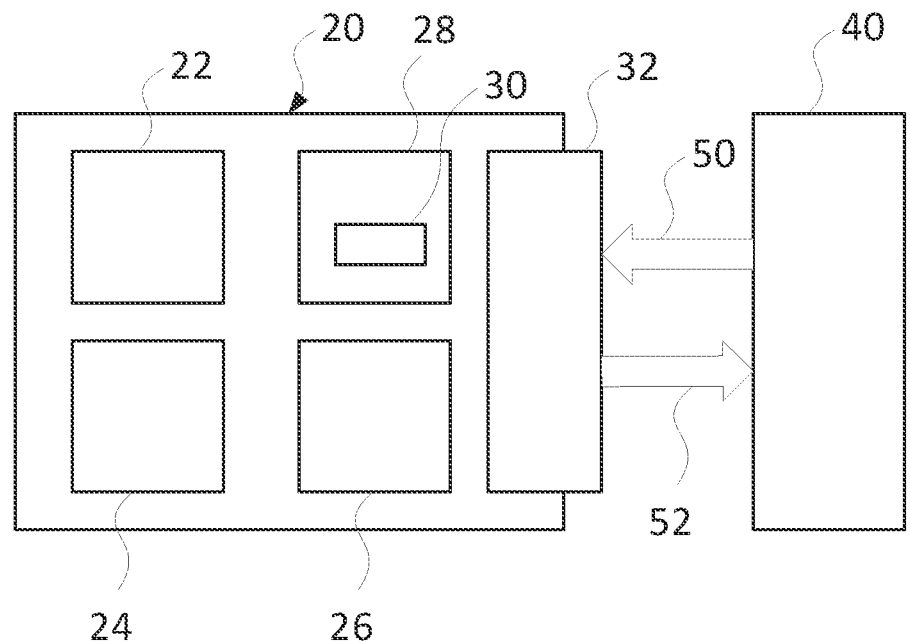
FIG. 1 is a schematical illustration of an exemplary embodiment of an OPC UA Server in accordance with the disclosure.

FIG. 1 schematically shows an exemplary embodiment of an OPC UA Server 20. The OPC UA Server 20 comprises at least one processor 22, at least one memory unit, e.g. a first memory unit 24 and a second memory unit 26, which is coupled to the processor 22, a control circuit 28, which is coupled to the processor 22, which is implemented in hardware, and which comprises a second address space 30. Optionally, the OPC UA Server 20 comprises an interface 32 for receiving a request 50 for data from an OPC UA Client 40. Alternatively, the request 50 may be directly received by the control circuit 28. For example, the interface 32 may be integrated into the control circuit 28. A response 52 of the OPC UA Server 20 may be sent to the OPC UA Client 40 via the control circuit 28 and/or via the interface 32.

The OPC UA Server 20 has a cascaded OPC UA Server solution inside, which consists of a hardware accelerated OPC UA Server, which is formed by the control circuit 28, and a software based OPC UA Server, which is formed by the processor 22 and the memory unit and which may be referred to as firmware based OPC UA Server. The hardware accelerated OPC UA Server may be implemented as an interface to the software implemented OPC UA Server.

The processor 22 may be a generic microcontroller and/or a Central Processing Unit (CPU). The first memory unit 24 may be a Random Access Memory (RAM), on which data exceeding a predetermined size and/or non-time-critical data are stored. The second memory unit 26 may be a Read Only Memory (ROM), on which one or more programs, e.g. a firmware of the software based OPC UA Server, are stored.

The control circuit 28 may be a router, a splitter, or a smart switch. The control circuit 28 may be implemented by a Field Programmable Gate Array (FPGA) and/or an Application-Specific Integrated Circuit (ASIC). The control circuit 28 may be the front-end to receive incoming OPC UA Service requests 50, i.e. the request 50 for the data, directly or via the interface 32. The second address space 30 is a hardware implemented component of the control circuit 28. For example, the control circuit 28 is implemented by a single chip, in which the second address space 30 is integrated. For example, the second address space 30 is a cache of the control unit 28.

Figure 2:
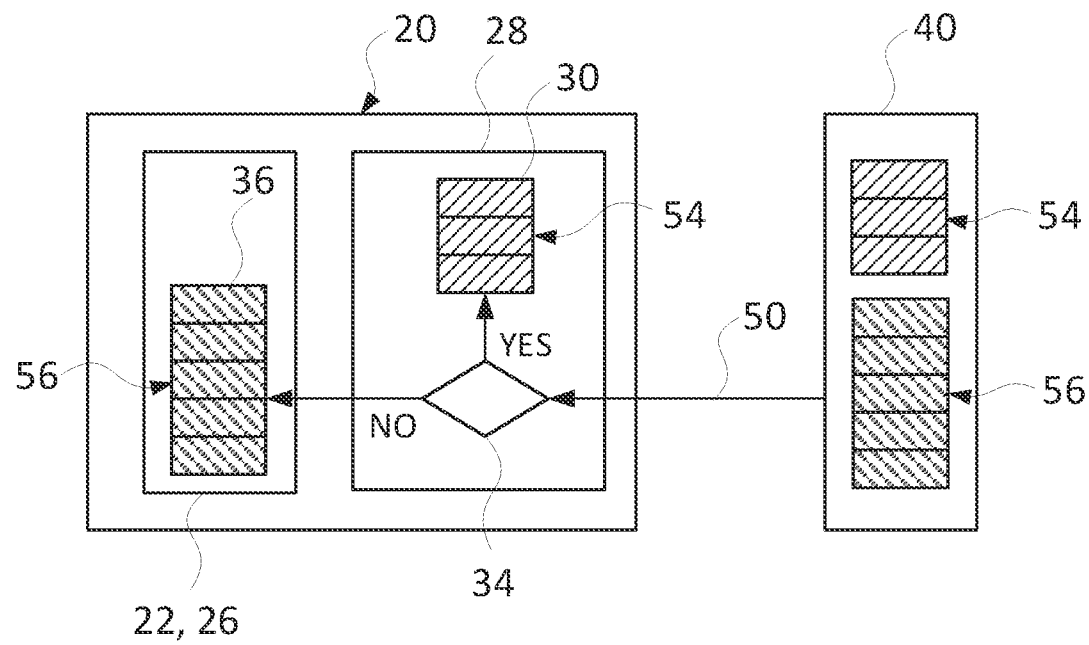
FIG. 2 is a schematical illustration of an exemplary embodiment of an OPC UA Server in accordance with the disclosure.

FIG. 2 schematically shows an exemplary embodiment of an OPC UA Server 20. The OPC UA Server 20 of FIG. 2 may widely correspond to the OPC UA Server 20 of FIG. 1. Therefore, only those features of the OPC UA Server 20 are explained in the following, which have not already been explained above, in order to avoid unnecessary repetitions.

The memory unit, e.g. the first memory unit 24 and the second memory unit 26, provides a first address space 36 containing first data 54. In addition, the first address space 36 contains a firmware of the OPC UA Server 20, in particular a firmware of the software-based part of the OPC UA Server 20. The second address space 30 of the control unit 28 contains second data 56. The control unit 28 comprises a determination unit 34, e.g. a part of the circuitry of the corresponding chip. The determination unit 34 is configured for determining, whether the request relates to the first data 54 or the second data 56.

The control circuit 28 receives the request 50 for the data from the OPC UA Client 40, directly or via the interface 32. The interface 32 may be a conventional Media Access Unit (MAU). The control circuit 28 may provide an endpoint for receiving the request 50. The endpoint may correspond to an IP-address of the OPC UA Sever 20. Optionally, the control circuit 28 may provide two or more endpoints for receiving the request 50. For example, a first endpoint may be provided for accessing the first data 54 and a second endpoint may be provided for accessing the second data 56.

The request contains an address associated with the requested data. The address is also referred to as NodeId, wherein each NodeId refers to a corresponding node. The address may be representative for the requested data being the first data 54 or the second data 56.

While the exemplary embodiments describe an OPC UA, it is contemplated that any data transfer related request uses an address called NodeId in the OPC UA specifications. The NodeId refers to the Node.

The control circuit 28, in particular the determination unit 34, determines, whether the request 50 and/or the data requires a slow data access or a fast data access. For example, the control unit 28, in particular the determination unit 34, determines, whether the request and/or the data requires the slow data access or the fast data access, depending on the address of the requested data. In other words, the control circuit 28 may work based on particular nodes representing the addresses and/or the data. Whenever the OPC UA Client 40 requests a fast node, the response 52 may be created from content found in the second address space 30 of the control circuit 28. In this context, all services of the OPC UA Server 20 for the OPC UA Client may be processed in a single session.

Alternatively or additionally, the control circuit 28, in particular the determination unit 34, determines, whether the request 50 and/or the data requires the slow data access or the fast data access, depending on the endpoint, to which the request 50 is directed, e.g. the first or second endpoint. In other words, the control circuit 28 branches based on the endpoint, e.g. a communication endpoint, that was used to access the corresponding node. In this context, the OPC UA Client 40 may run two separate sessions, one on each of the OPC UA Server 20 offered endpoints, e.g. the first endpoint and the second endpoint.

Alternatively or additionally, the control circuit 28, in particular the determination unit 34, determines, whether the request 50 and/or the data requires the slow data access or the fast data access, depending on the requested data. For example, data, which are used for a parameterization, a configuration, and/or a diagnose of the OPC UA Client 40, and/or data exceeding a predetermined amount of data are classified as the first data 54 and stored in the first address space 36 of the memory unit of the OPC UA Server 20. In contrast, data, which are bound to real-time requirements, which are needed in the context of a control process of the OPC UA Client 40, e.g. IO-Signals, or data, which are requested with at least a predetermined frequency or higher, may be classified as the second data 56 and stored in the second address space 30 of the control circuit 28.

After the determination, the control circuit 28 obtains the first data 54 from the first address space 36 of the first and/or second memory unit 24, 26, if the request 50 and/or the data requires the slow data access, and obtains the second data 56 from the second address space 30, if the request 50 and/or the data requires the fast data access. Then, the control circuit 28 sends the response 52 containing the obtained first or second data 54, 56 to the OPC UA Client 40.

So, the OPC UA Server 20 is implemented by the cascade of the software based OPC UA Server attached in behind the hardware accelerated OPC UA Server to address both, need to support a fast data access, e.g. for the real-time related requirements and/or regularly used data, and the need to support a larger amount of data. The control circuit 28 is enabled to distinguish the slow first data 54 from the fast second data 56 and to determine where the corresponding data is located. In addition, the control circuit 28 has the hardware implemented second address space 30 and a direct and fast access to the second data 56 stored on it.

Figure 3:
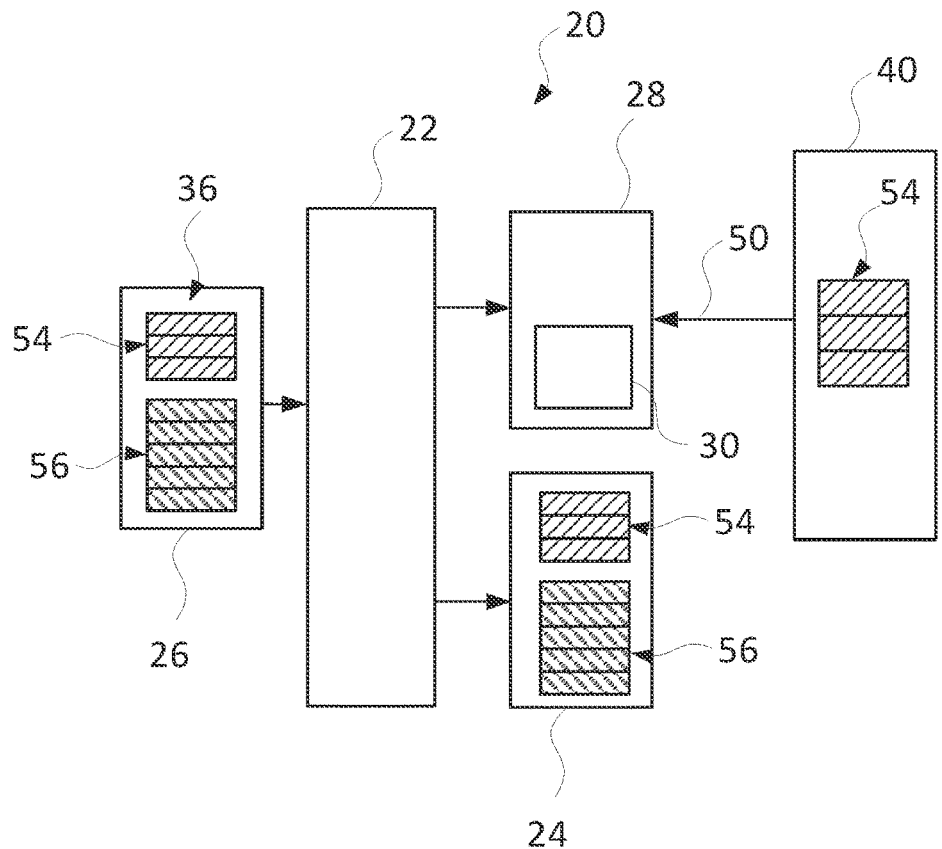
FIG. 3 is a schematical illustration of an exemplary embodiment of an OPC UA Server in a first state, in accordance with the disclosure.

FIG. 3 schematically shows an exemplary embodiment of an OPC UA Server 20 in a first state.

Figure 4:
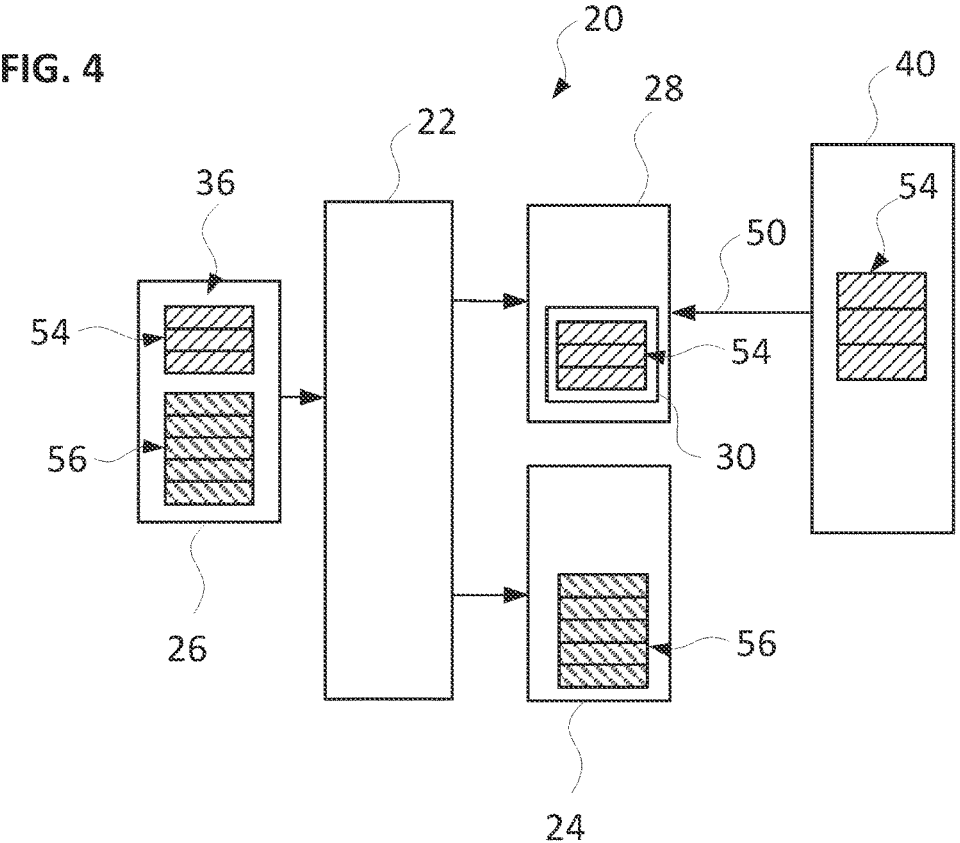
FIG. 4 is a schematical illustration of the OPC UA Server of FIG. 3 in a second state.

FIG. 4 schematically shows the OPC UA Server 20 of FIG. 3 in a second state.

FIG. 3 and FIG. 4 illustrates two different states of a dynamic cache configuration. The OPC UA Server 20 shown in FIGS. 3 and 4 may widely correspond to one of the above OPC UA Servers 20. Therefore, only those features of the OPC UA Server 20 are explained in the following, which have not already been explained above, in order to avoid unnecessary repetitions.

The OPC UA Server 20 combining the hardware accelerated OPC UA Service of the control circuit 28 with the software-based address space management of the processor 22 and the memory unit 24, 26 uses a cache-based concept. While the embodiments of the OPC UA Server 20 explained above with respect to FIGS. 1 and 2 run at a fixed partitioning of fast hardware managed data versus a software-based address space management, the OPC UA Server 20 shown in FIGS. 3 and 4 run an automated, adaptable partitioning.

The hardware accelerated OPC UA Server, i.e. the control circuit 28, comprises a caching logic and a cache, e.g. the second address space 30, as shown in FIG. 3. In this first state the cache is empty. The first state may be present at an initial start-up or at every start of the OPC UA Server 20. In the first state, the OPC UA Server 20 may exchange the first data supported by the "slow" firmware responding with content found in the first and/or second memory unit 24, 26.

In the following, the OPC UA Client 40 may frequently request just a subset of all data available from the OPC UA Server 20. The control circuit 28 recognizes the corresponding frequently addressed nodes, classifies the corresponding data as first data, and moves them inside the cache, as shown with respect to the second state in FIG. 4. Alternatively, the firmware running on the processor 22 recognizes the frequent demand on this subset of nodes and transfers these frequently needed nodes into the cache of the control circuit 28. In any case, further requests to theses nodes will be handled by the control circuit 28.

If the OPC UA Client 40 addresses one of these cached nodes, the corresponding response 52 comes faster because of the hardware implemented logic. If the OPC UA Client 40 addresses a node outside the cache, the response 52 is generated from the first data that is managed by the software running in the processor 22, e.g. the firmware of the software-based OPC UA Server.

Figure 5:
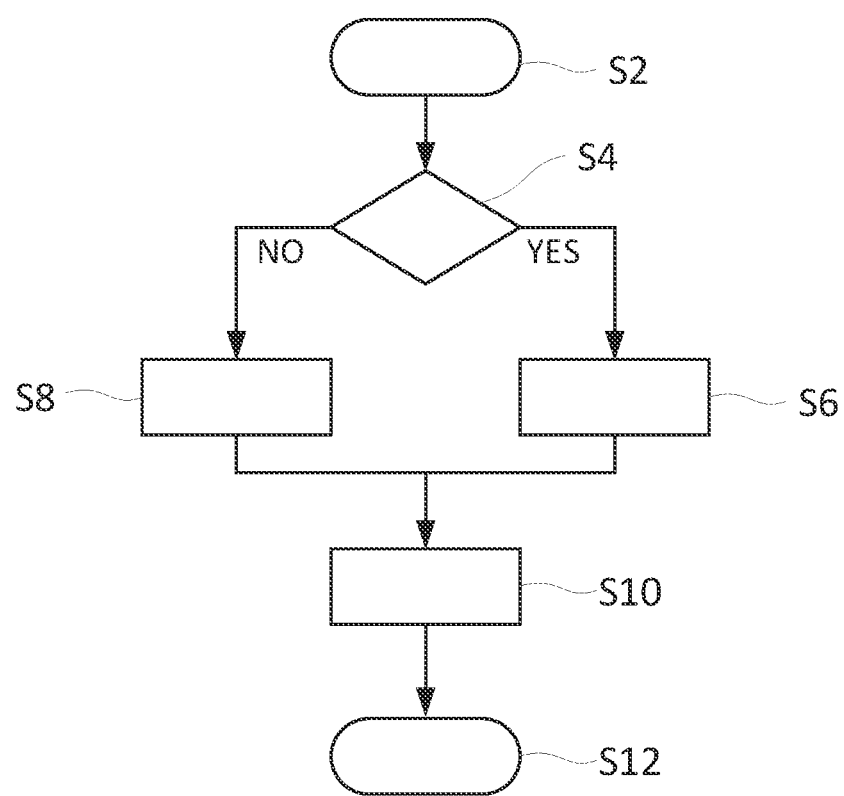
FIG. 5 is a flowchart of an embodiment of a method for controlling an OPC UA Server in accordance with the disclosure.

FIG. 5 shows a flowchart of an embodiment of a method for controlling an OPC UA Server, e.g. one of the above OPC UA Servers 20. During the start-up of the OPC UA Server 20 the firmware may load the fast part of the data, i.e. the second data 56, and other parameters into the second address space 30 of the control circuit 28 to initialize the OPC UA Server 20 in general. Additionally, the firmware may establish the firmware managed slow part of the data, i.e. the first data 54, in the firmware managed memory unit, e.g. the first and/or second memory unit 24, 26, and starts the firmware-based control over the first address space of this memory unit. This kind of control function is a data manager, which is connected to the control circuit 28. The control circuit 28, which may be a splitter or a router implemented by an FPGA or ASIC knows whether the response can be fed with the second data from the fast second address space 30 or whether the data to respond is found in the memory unit, i.e. the first data.

In step S2, the request 50 for data is received from the OPC UA Client 40.

In step S4, it is determined, whether the request 50 and/or the data requires the fast data access, e.g. by the hardware implemented control circuit 28 of the OPC UA Server. If the request contains an address, i.e. a node, associated with the requested data, it may be determined, whether the request and/or the data requires the slow data access or the fast data access, depending on the address of the requested data. Alternatively or additionally, if the control unit 28 provides the first endpoint for accessing the first data and the second endpoint for accessing the second data, it may be determined, whether the request 50 and/or the data requires the slow data access or the fast data access, depending on the endpoint, to which the request 50 is directed. So, depending on the selected implementation, the branch logic makes its decision either based on the address of the requested node or based on the endpoint that is used to request a node.

Alternatively or additionally, it may be determined, whether the request 50 and/or the data requires the slow data access or the fast data access, depending on the requested data. For example, data, which is used for a parameterization, a configuration, and/or a diagnose of the OPC UA Client 40, and/or data exceeding a predetermined amount of data may be classified as the first data 54 and stored in the memory unit 24, 26 of the OPC UA Server 20. For example, data, which is bound to real-time requirements, which is needed in the context of a control process of the OPC UA Client 40, e.g. IO-Signals, is classified as the second data 56 and stored in the second address space 30 of the control circuit 28.

Alternatively or additionally, data, which is requested at least for a predetermined number of times may be classified as the second data 56 and stored in the second address space 30 of the control circuit 28.

If it is determined that the request 50 and/or the data requires the fast data access, the method proceeds with step S6. If it is determined that the request 50 and/or the data does not require the fast data access but the slow data access, the method proceeds with step S8.

In step S6, the second data 56 is obtained from the second address space 30 by the control circuit 28. So, if response relevant data is found in the control circuit 28, the response is generated by the control circuit 28 based hardware, which means the response is very fast.

In step S8, the first data 54 is obtained from the memory unit 24, 26 by the processor 22 of the OPC UA Server 20. So, if response relevant data is found in the first address space 36 of the memory unit, the control circuit 28 built in logic may involve the firmware managing the first address space 36 to feed its memory located first data into the response finalized in the control circuit 28.

In step S10, the obtained first or second data 54, 56 is sent to the OPC UA Client 40, e.g. by the control circuit 28.

In step S12, the method may be ended. Alternatively, the method may start again in step S2, if a corresponding further request 50 is received from the OPC UA Client 40.

The above method may be embodied as a computer program for operating the control circuit 28, which, when being executed by the control circuit 28, is adapted for performing the above method. The computer program may be stored in a computer-readable medium.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

An object is achieved by a method for controlling an OPC UA Server, the method comprising: receiving a request for data from an OPC UA Client; determining, whether the request and/or the data requires a slow data access or a fast data access, by a hardware implemented control circuit of the OPC UA Server; obtaining first data from a memory unit of the OPC UA Server, if the request and/or the data requires the slow data access; obtaining second data from an second address space of the control circuit, if the request and/or the data requires the fast data access; and sending the obtained first or second data to the OPC UA Client.

The data may comprise parameters, variables, program code, and/or whole objects, as e.g. services or applications. In general, the data requested from an OPC UA Client, e.g. an instrumentation device, can be divided into first data which are not time-critical and/or big, and second data which are time-critical, e.g. real-time data. The first data may be used occasionally, e.g. for parameterization, diagnose, and/or configuration purpose. The second data may be needed in the context of a control process, e.g. IO-Signals. The transport of IO-signals is bound to real-time requirements. So, the address space of the OPC UA Server is divided into a (conventional) first address space of the memory unit of the OPC UA Server that can run on slower data access, and a second address space of the hardware implemented control circuit that supports fast data access. The first data is stored in the first address space of the memory unit and the second data is stored in the second address space of the control circuit.

A processor of the OPC UA Server and the memory unit provide a software based OPC UA Server. The control circuit provides a hardware accelerated OPC UA Server. So, the OPC UA Server provides a cascade of a software based OPC UA Server attached in behind to a hardware accelerated OPC UA Server to address both, the need to support an access to the first data, i.e. a larger amount of data and/or data which are not time-critical, and to support a fast data access to the second data, e.g. data with real-time related requirements.

The request for the data may be received by the control circuit. The control circuit may be a front-end, a splitter, and/or a router of the OPC UA Server. The control circuit is hardware implemented, e.g. by an FPGA or an ASIC. The memory unit may comprise a Read Only Memory (ROM) and/or a Random Access Memory (RAM). The memory unit contains the first data and optionally a firmware of the OPC UA Server.

According to one or more embodiments, the request contains an address, e.g. a node, associated with the requested data and it is determined, whether the request and/or the data requires a slow data access or a fast data access, depending on the address of the data. This enables to identify easily and accurately the first and second data, and the corresponding address space where the data is stored. For example, the control unit comprises a look-up table in which the addresses of the data are classified in addresses associated with the first data and in addresses associated with the second data. After receiving the request, the control unit may check whether the requested data is the first data or the second data with the help of the look-up table.

According to one or more embodiments, it is determined, whether the request and/or the data requires a slow data access or a fast data access, depending on an endpoint, to which the request is directed, and which is provided by the control circuit. This enables to identify easily and accurately the first and second data, and the corresponding address space where the data is stored. The endpoint may be an interface and/or an internet-address of the OPC UA Server. The OPC UA Server may have two or more endpoints, wherein at least one endpoint serves as an interface to the first data and at least one endpoint serves as an interface to the second data. Vividly described, the addresses, i.e. the nodes, of the data are organized in a tree structure and the endpoints are the roots of the tree structure, wherein one corresponding tree of data may have two or more endpoints for accessing the corresponding data. For example, the control circuit provides a first endpoint for providing the first data and a second endpoint for providing the second data.

According to one or more embodiments, it is determined, whether the request and/or the data requires a slow data access or a fast data access, depending on the requested data. In other words, the control circuit may determine depending on the requested data, whether the data is the first data or the second data. This enables to identify easily and accurately the first and second data, and the corresponding address space where the data is stored. For example, the control unit may determine depending on a property, e.g. a content and/or a format, of the data whether the data is the first data or the second data.

According to one or more embodiments, data, which is requested at least with a predetermined frequency or higher, is classified as the second data and stored in the second address space of the control circuit. For example, the control circuit determines a frequency at which the data is accessed and if the determined frequency corresponds to a predetermined frequency or higher, the data is classified as the second data and stored in the second address space of the control circuit. In other words, the control circuit uses the frequency of accessing the data to differentiate whether the corresponding data is first data stored in the first address space or second data stored in the second address space. So, the predetermined frequency of accessing the data is representative for the corresponding data being second data requested on a frequent, e.g. milli-second, basis or first data requested on a non-frequent basis. This contributes to that the data, which is requested on a frequent basis, is quickly available.

According to one or more embodiments, data, which is used for a parameterization, a configuration, and/or a diagnose of the OPC UA Client, and/or data exceeding a predetermined amount of data is classified as the first data and stored in the memory unit of the OPC UA Server. This enables to keep the space of the second address space available for the second data.

According to one or more embodiments, data, which is bound to real-time requirements and/or which is needed in the context of a control process of the OPC UA Client, e.g. IO-Signals, is classified as the second data and stored in the second address space of the control circuit. This enables to provide a fast access to this time-critical data.

It has to be understood that features, embodiments, and advantages of the method as described above and in the following may be features, embodiments and, respectively, advantages of the OPC UA Server, the control circuit for the OPC UA Server, the computer program for operating the control circuit, and/or the computer-readable medium, in which the computer program is stored, as described above and in the following.

An object is achieved by the OPC UA Server, comprising: at least the processor; at least the one memory unit, which is coupled to the processor and which provides the first address space containing the first data; the control circuit, which is coupled to the processor, which is implemented in hardware, and which comprises the second address space containing the second data; wherein the control circuit is configured for: receiving the request for the data from the OPC UA client; determining, whether the request and/or the data requires the slow data access or the fast data access; obtaining the first data from the memory unit, if the request and/or the data requires the slow data access; obtaining the second data from the second address space, if the request and/or the data requires the fast data access; and sending the obtained first or second data to the OPC UA Client.

According to one or more embodiments, the request contains the address, e.g. the node, associated with the requested data and it is determined, whether the request and/or the data requires the slow data access or the fast data access, depending on the address of the data.

According to one or more embodiments, the control circuit provides at least two endpoints for receiving the request and is configured for determining, whether the request and/or the data requires the slow data access or the fast data access, depending on the endpoint, to which the request is directed. For example, the control circuit provides a first endpoint for providing the first data and a second endpoint for providing the second data.

According to one or more embodiments, the control circuit is configured for determining, whether the request and/or the data requires the slow data access or the fast data access, depending on the requested data.

According to one or more embodiments, data, which is requested with at least the predetermined frequency or higher is classified as the second data and stored in the second address space of the control circuit.

An object is achieved by the control circuit for the OPC UA Server. The control circuit comprises the second address space and is configured for: receiving the request for the data from the OPC UA Client; determining, whether the request and/or the data requires the slow data access or the fast data access; obtaining the first data from the memory unit of the OPC UA Server, if the request and/or the data requires the slow data access; obtaining the second data from the second address space, if the request and/or the data requires the fast data access; and sending the obtained first or second data to the OPC UA Client.

An object is achieved by a computer program for operating the control circuit for the OPC UA Server, which, when being executed by a processor, is adapted for performing the above method.

An object is achieved by a computer-readable medium in which the above computer program is stored. The computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. The computer readable medium may also be a data communication network, e.g. the Internet, which allows downloading the program code. In general, the computer-readable medium may be a non-transitory or transitory medium.

These and other aspects of the invention become apparent from and elucidated with reference to the embodiments described herein.

LIST OF REFERENCE SYMBOLS

20 OPC UA Server
22 processor
24 first memory unit
26 second memory unit
28 control circuit
30 second address space
32 interface
34 determination unit
36 first address space
40 OPC UA Client
50 request
52 response
54 first data
56 second data
S2-S12 steps two to twelve All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for controlling an OPC UA Server, the method comprising:
receiving a request for data from an OPC UA Client;
determining by a hardware implemented control circuit of the OPC UA Server whether at least one of the request or the data requires a slow data access or a fast data access as in comparison to each other;
when the determination indicates that at least one of the request or the data requires the slow data access, obtaining first data from a first address space of a memory unit of the OPC UA Server;
when the determination indicates that at least one of the request or the data requires the fast data access, obtaining second data from a second address space of the control circuit; and
sending the obtained first or second data to the OPC UA Client.

2. The method in accordance with claim 1, wherein the request contains an address associated with the requested data, and wherein the determination whether the request and/or the data requires the slow data access or the fast data access depends on the address of the requested data.

3. The method in accordance with claim 1, wherein the determination whether at least one of the request or the data requires the slow data access or the fast data access depends on an endpoint to which the request is directed and which is provided by the control circuit.

4. The method in accordance with claim 1, wherein the determination whether at least one of the request or the data requires the slow data access or the fast data access depends on the requested data.

5. The method in accordance with claim 1, wherein data, which is requested at least with a predetermined frequency or higher, is classified as the second data and stored in the second address space of the control circuit.

6. The method in accordance with claim 1, wherein data, which is used for a parameterization, a configuration, and/or a diagnose of the OPC UA Client, and/or data exceeding a predetermined amount of data, is classified as the first data and stored in the memory unit of the OPC UA Server.

7. The method in accordance with claim 1, wherein data, which is bound to real-time requirements and/or which is needed in the context of a control process of the OPC UA Client, is classified as the second data and stored in the second address space of the control circuit.

8. The method in accordance with claim 7, wherein the data is input/output (IO) Signals.

9. An OPC UA Server, comprising:
at least one processor;
at least one memory unit, which is coupled to the processor and which provides a first address space containing first data;
a control circuit, which is coupled to the processor, which is implemented in hardware, and which comprises a second address space containing second data;
wherein the control circuit is configured for:
receiving a request for data from an OPC UA Client;
determining, whether at least one of the request or the data requires a slow data access or a fast data access as in comparison to each other;
obtaining the first data from the memory unit, if at least one of the request or the data requires the slow data access;
obtaining the second data from the second address space, if at least one of the request or the data requires the fast data access; and
sending the obtained first or second data to the OPC UA Client.

10. The OPC UA Server in accordance with claim 9, wherein the request contains an address associated with the requested data, and wherein the control circuit is configured to determine whether at least one of the request or the data requires the slow data access or the fast data access, depending on the address of the requested data.

11. The OPC UA Server in accordance with claim 9, wherein the control circuit provides at least two endpoints for receiving the request and is configured for determining whether at least one of the request or the data requires the slow data access or the fast data access depending on the endpoint to which the request is directed.

12. The OPC UA Server in accordance with claim 9, wherein the control circuit is configured for determining whether at least one of the request or the data requires the slow data access or the fast data access depending on the requested data.

13. The OPC UA Server in accordance with claim 9, wherein data, which is requested with at least a predetermined frequency or higher is classified as the second data and stored in the second address space of the control circuit.

14. A control circuit for an OPC UA Server, the OPC UA Server comprising a second address space and being configured for:
receiving a request for data from an OPC UA Client;
determining whether at least one of the request or the data requires a slow data access or a fast data access as in comparison to each other;
obtaining first data from a memory unit of the OPC UA Server when the determination indicates that at least one of the request or the data requires the slow data access;
obtaining second data from the second address space when the determination indicates that the request and/or the data requires the fast data access; and
sending the obtained first or second data to the OPC UA Client.

15. The control circuit for an OPC UA Server in accordance with claim 14, wherein the request contains an address associated with the requested data, and wherein the control circuit is configured to determine whether at least one of the request or the data requires the slow data access or the fast data access, depending on the address of the requested data.

16. The control circuit for an OPC UA Server in accordance with claim 14, wherein the control circuit provides at least two endpoints for receiving the request and is configured for determining whether the request and/or the data requires the slow data access or the fast data access depending on the endpoint to which the request is directed.

17. The control circuit for an OPC UA Server in accordance with claim 14, wherein the control circuit is configured for determining whether at least one of the request or the data requires the slow data access or the fast data access depending on the requested data.

18. The control circuit for an OPC UA Server in accordance with claim 14, wherein data, which is requested with at least a predetermined frequency or higher is classified as the second data and stored in the second address space of the control circuit.

* * * * *